(12) United States Patent
Suri (10) Patent No.: US 9,853,405 B2
(45) Date of Patent: Dec. 26, 2017

(54) PORTABLE FURNITURE POWER OUTLET

(71) Applicant: Harpreet Singh Suri, Oviedo, FL (US)

(72) Inventor: Harpreet Singh Suri, Oviedo, FL (US)

( * ) Notice: Subject to any disclaimer, the term of this patent is extended or adjusted under 35 U.S.C. 154(b) by 0 days.

(21) Appl. No.: 15/005,055

(22) Filed: Jan. 25, 2016

(65) Prior Publication Data

US 2017/0214197 A1    Jul. 27, 2017

(51) Int. Cl.
| H01R 13/60 | (2006.01) |
| H01R 25/00 | (2006.01) |
| H02J 7/02 | (2016.01) |

(52) U.S. Cl.
CPC ............ *H01R 25/006* (2013.01); *H02J 7/025* (2013.01)

(58) Field of Classification Search
CPC .. H01R 25/006; H01R 13/512; H01R 13/514; H01R 13/506; H01R 25/003; H01R 13/70; G06F 1/266; G06F 1/3231
USPC ........................................................ 439/539
See application file for complete search history.

(56) References Cited

U.S. PATENT DOCUMENTS

| 3,259,804 | A | * | 7/1966 | Parstorfer | ............... | H05K 5/064 |
| | | | | | | 165/80.3 |
| 5,225,765 | A | * | 7/1993 | Callahan | ................. | F21V 23/04 |
| | | | | | | 315/194 |
| 5,649,839 | A | * | 7/1997 | Yu | ....................... | H01R 25/003 |
| | | | | | | 200/51 R |
| 7,410,379 | B1 | * | 8/2008 | Byrne | ................. | H01R 13/652 |
| | | | | | | 439/215 |
| 9,368,982 | B2 | * | 6/2016 | Jansen | ................... | H02J 7/0021 |
| 2003/0034167 | A1 | * | 2/2003 | DeLand | ................. | H02G 3/288 |
| | | | | | | 174/50 |
| 2005/0170678 | A1 | * | 8/2005 | Donahue | ............. | H01R 13/514 |
| | | | | | | 439/214 |
| 2006/0258226 | A1 | * | 11/2006 | Milan | .................. | H01R 13/506 |
| | | | | | | 439/652 |
| 2008/0012423 | A1 | | 1/2008 | Mimran | | |
| 2008/0214033 | A1 | * | 9/2008 | Byrne | ...................... | H02G 3/00 |
| | | | | | | 439/215 |
| 2011/0275230 | A1 | * | 11/2011 | Riner | ................... | H01R 13/512 |
| | | | | | | 439/211 |
| 2011/0282509 | A1 | * | 11/2011 | Yegin | ...................... | G06F 1/266 |
| | | | | | | 700/295 |
| 2012/0161973 | A1 | * | 6/2012 | Hsu | .......................... | H01H 9/08 |
| | | | | | | 340/584 |
| 2012/0278640 | A1 | * | 11/2012 | Caglianone | .......... | G06F 1/3231 |
| | | | | | | 713/323 |
| 2015/0001937 | A1 | * | 1/2015 | Wang | ..................... | H01R 13/70 |
| | | | | | | 307/52 |

(Continued)

OTHER PUBLICATIONS https://www.indiegogo.com/projects/couchlet-power-up-your-sofa-usb#/updates.

*Primary Examiner* — Jean F Duverne
(74) *Attorney, Agent, or Firm* — Jason T. Daniel, Esq.; Daniel Law Offices, P.A.

(57) ABSTRACT

A portable furniture power outlet includes a power module having one or more AC receptacles and DC connector ports. A transformer supplies DC power to the DC connector ports at different voltages and provides wireless device charging. An elongated fin member extends downward from the power module and includes a shape and size for being positioned between two cushions in either a vertical or horizontal orientation. The fin member is secured to the power module by a two axis hinge that allows the power module to spin and pivot with respect to the fin member.

18 Claims, 7 Drawing Sheets

(56) References Cited

U.S. PATENT DOCUMENTS

| | | | |
|---|---|---|---|
| 2015/0255914 A1* | 9/2015 | Kong | H01R 13/5227 439/108 |
| 2016/0097522 A1* | 4/2016 | Chien | F21V 33/00 362/183 |

* cited by examiner

PORTABLE FURNITURE POWER OUTLET

TECHNICAL FIELD

The present invention relates generally to extension cords, and more particularly to a portable power outlet that can be removably secured to furniture such as a sofa or chair.

BACKGROUND

The statements in this section merely provide background information related to the present disclosure and may not constitute prior art.

One of the most ubiquitous pieces of furniture found in virtually every home across the globe is a sofa or couch. Sofas typically consist of an upholstered elongated structure having a plurality of cushions that are arranged side-by-side along the length thereof. These cushions typically defining individual seats for the sofa occupants.

Owing to recent advancements in technology, the number of portable electronic devices such as smartphones, music players, tablets and laptop computers, for example, has grown exponentially. As such, many individuals routinely utilize their electronic devices while sitting on a sofa. Unfortunately, when the power level of the device is low or exhausted, it becomes it necessary for the user to find a power outlet to charge their device.

Although virtually all residential buildings have at least one AC power wall outlet in each room, the outlets are often hidden by furniture or located some distance from where the user on the couch is seated. When this situation occurs, the user must stretch their power charging cord from their device to the outlet, or utilize an extension cord to do the same.

Although this procedure satisfies the need to provide power to their electronic device, the resulting mess of cords is aesthetically unpleasing, and can be dangerous, as the exposed wires present a tripping hazard to anyone walking near the sofa.

Accordingly, it would be beneficial to provide a portable power outlet for furniture that can be removably positioned along or between the cushions, in order to provide a convenient location for charging portable electronic devices, and without suffering from the drawbacks described above.

SUMMARY OF THE INVENTION

The present invention is directed to a portable furniture power outlet. One embodiment of the present invention can include a power module having one or more AC receptacles and DC connector ports. A transformer having a power cord and plug can be provided to supply DC power to the DC connector ports at different voltages. The device can also include an elongated fin member that extends downward from the power module. The fin can include a shape and size that is capable of being positioned between two cushions in either a vertical or horizontal orientation.

Another embodiment of the present invention can include a transformer that performs wireless device charging, and a two axis hinge that allows the power module to spin and pivot with respect to the fin member.

Yet another embodiment of the present invention can include central curve that is positioned along the fin member. The curve can cause the body of the fin to form a right angle, so as to be positioned along two sides of a single furniture cushion.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As described herein, the term "removably secured," "removably connected," and derivatives thereof shall be used interchangeably to describe a situation wherein two or more objects are joined together in a non-permanent manner so as to allow the same objects to be repeatedly joined and separated. Likewise, the terms "pivotally secured," "rotatably connected," and all derivatives thereof shall be used interchangeably to describe a situation wherein two or more objects are joined together in a manner that allows one or both of the objects to pivot and/or rotate about or in relation to the other object. Several nonlimiting examples include traditional hinge mechanisms, pivoting couplers and/or swivel flanges, for example.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIGS. 1-5B illustrate various embodiments of a portable furniture power outlet device 10 that are useful for understanding the inventive concepts disclosed herein. Although shown and described throughout this document as being used in conjunction with the cushions 2 of a sofa 1, this is for illustrative purposes only. To this end, the device can be utilized with any type of furniture having cushions and/or channels into which the device can be positioned. Therefore, the device is not to be construed as limiting to any particular use or industry.

Figure 1:
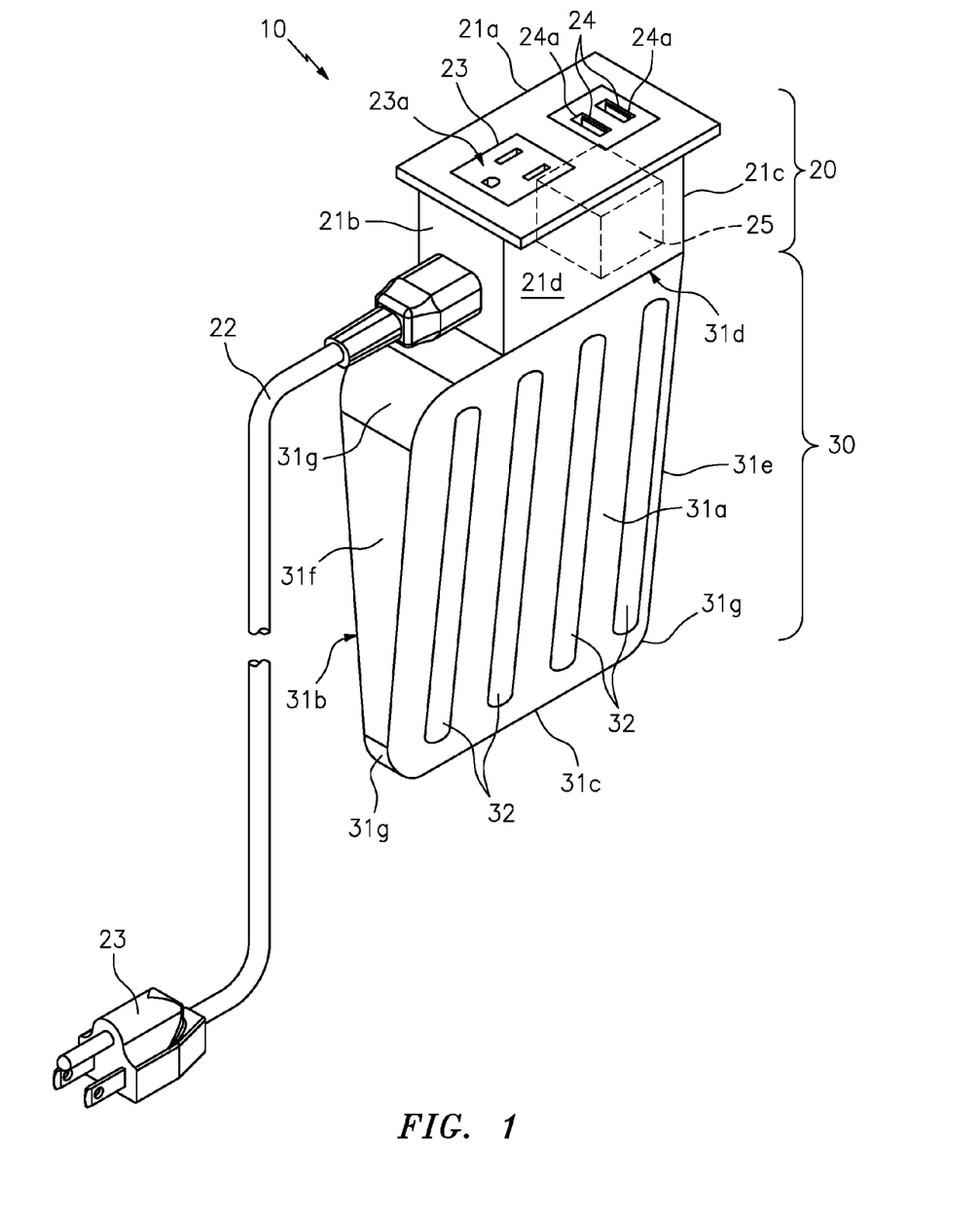
FIG. 1 is a side view of a portable furniture power outlet device that is useful for understanding the inventive concepts disclosed herein.

FIG. 1 illustrates one embodiment of the portable power outlet device 10 that includes, essentially, a power module 20 and an elongated fin member 30. As shown, the power module 20 can include a frame/housing having any number of different shapes and sizes, including the generally rectangular shape illustrated. The housing can include a top wall 21a and one or more upstanding walls such a rear wall 21b, a front wall 21c and a side wall 21d, for example, defining an internal cavity.

As shown, an elongated power cord 22 having a plug 22a, such as the illustrated three-prong plug, for example can extend outward from the housing 21b and can be connected to a wall outlet (not illustrated). The cord 22 can include any number of different lengths, and will preferably be routed between the cushions 2, and through the rear of the couch 1, so as to allow the majority of the cord to be hidden by the couch itself.

One or more AC receptacle openings 23, and/or one or more DC connector port openings 24 can be disposed along the top wall 21a. Each of these openings functioning to receive an AC receptacle 23a and/or a DC connector port 24a, respectively therethrough. In the preferred embodiment, each of the DC connector ports can include or comprise a Universal Serial Bus (USB) connector port for receiving a conventional USB plug.

In one embodiment, the power module can also include a built-in transformer 25 which can function to change the voltage (V) from 110 or 220 to low voltages such as 2.5V, 4V and/or 5V, for example. In various embodiments, the transformer can function to automatically sense the voltage requirements of a user device, and automatically adjust the output voltage of the DC connector port(s) to the necessary voltage. Such a feature advantageously allows users to charge one or more devices having different power requirements.

Although described above as including AC receptacle(s) and DC connector ports, along the top wall 21a, the inventive concepts are not to be construed as limiting to any particular number or type of receptacles/ports, or location(s) along the power module. As such, any number and type of power outlets can be provided within or along any wall of the power module, so as to be able to provide the necessary power requirements for one or more portable electronic devices or other such objects requiring a power outlet. To this end, the transformer 25 can include functionality for performing wireless or induction charging of a portable device. To this end, the transformer can include or comprise two induction coils capable of generating an electromagnetic field that transfers energy from the power module 20 to a portable electronic device without requiring the device to be physically plugged in.

Figure 2:
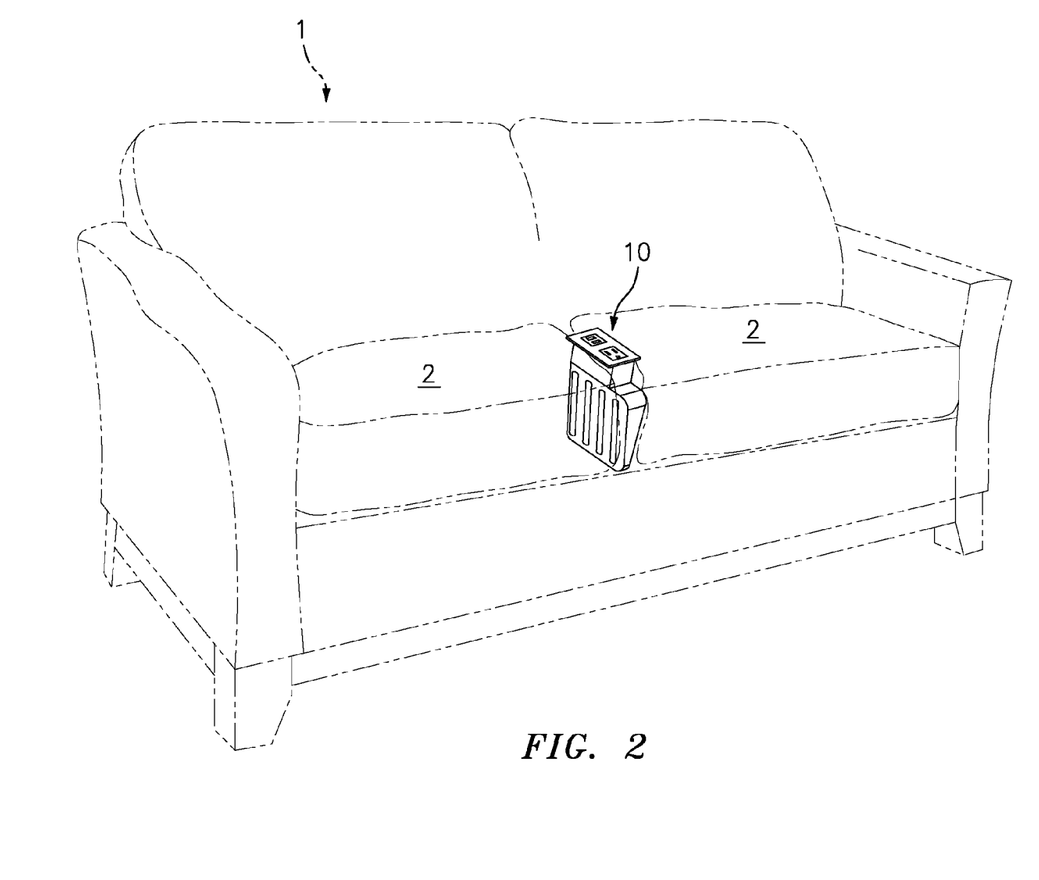
FIG. 2 is a perspective view of the portable furniture power outlet device in operation, in accordance with one embodiment of the invention.

The elongated fin member 30 can be fixedly or pivotally connected to the bottom end of the power module so as to extend downward therefrom, in order to be inserted vertically between the seat cushions 2 of the sofa 1, as shown in FIG. 2. In the preferred embodiment, the fin can be constructed from a lightweight piece of injection molded plastic, for example, and can include a generally wedge-shaped body having a first side surface 31a, a second side surface 31b, a bottom edge 31c, a top edge 31d a front edge 31e and a rear edge 31f. The fin can be constructed so as to be rigid, or can be constructed to be generally malleable/semi-flexible in nature.

In various embodiments, the corners can include radiused edges 31g, in order to prevent the corners from damaging the sofa material. Additionally, a plurality of ridges 32 can be disposed along the first and/or second side surfaces of the fin body. The ridges can be constructed from an identical material as the fin body, or from any number of different materials such as rubber, for example. In either instance, the shape and/or material of the ridges can assist the fin to remain affixed between the cushions, in order to prevent the device from moving or shifting during operation.

Figure 3A:
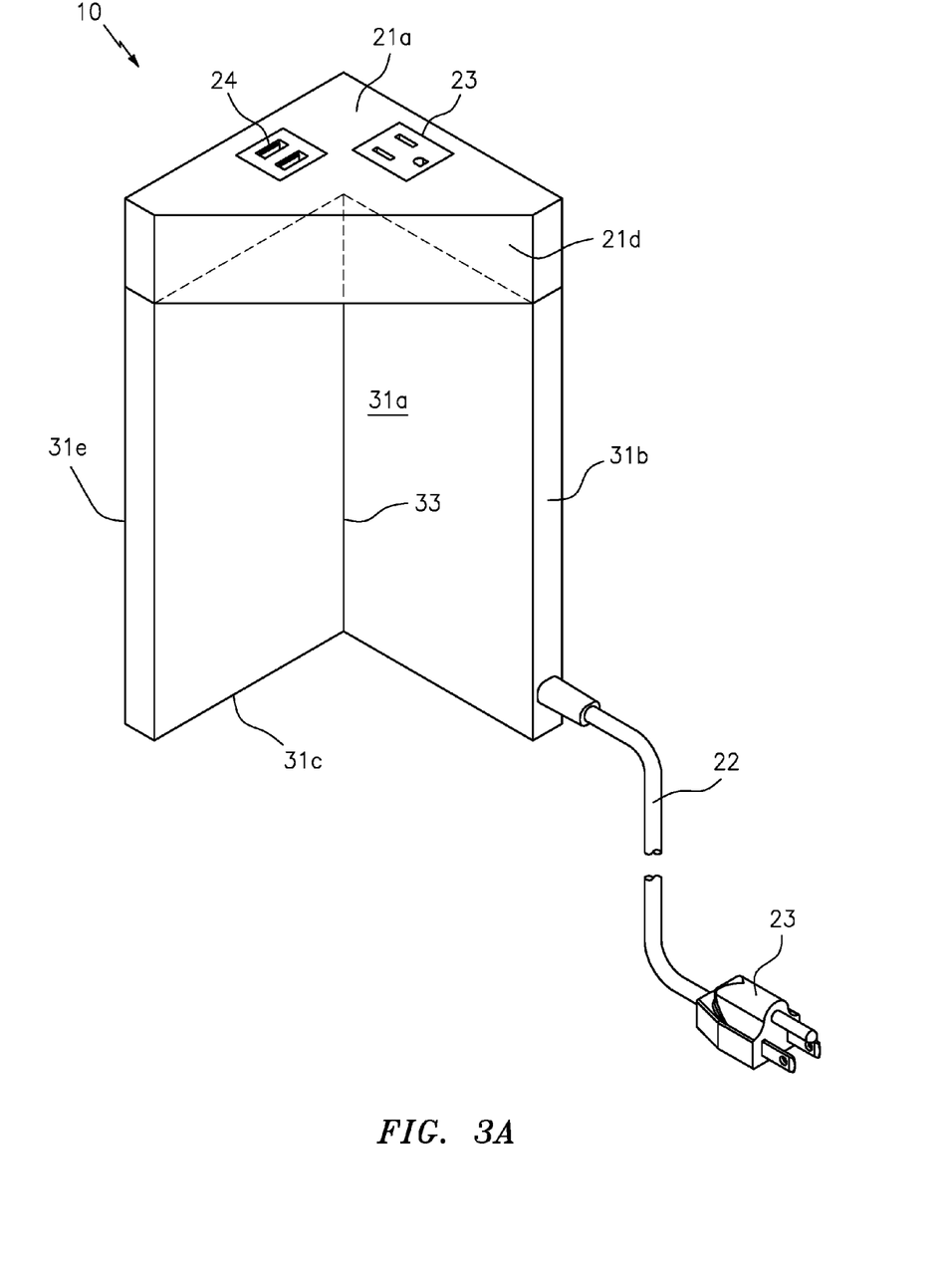
FIG. 3A is a perspective view of the portable furniture power outlet device, in accordance with another embodiment of the invention.
Figure 3B:
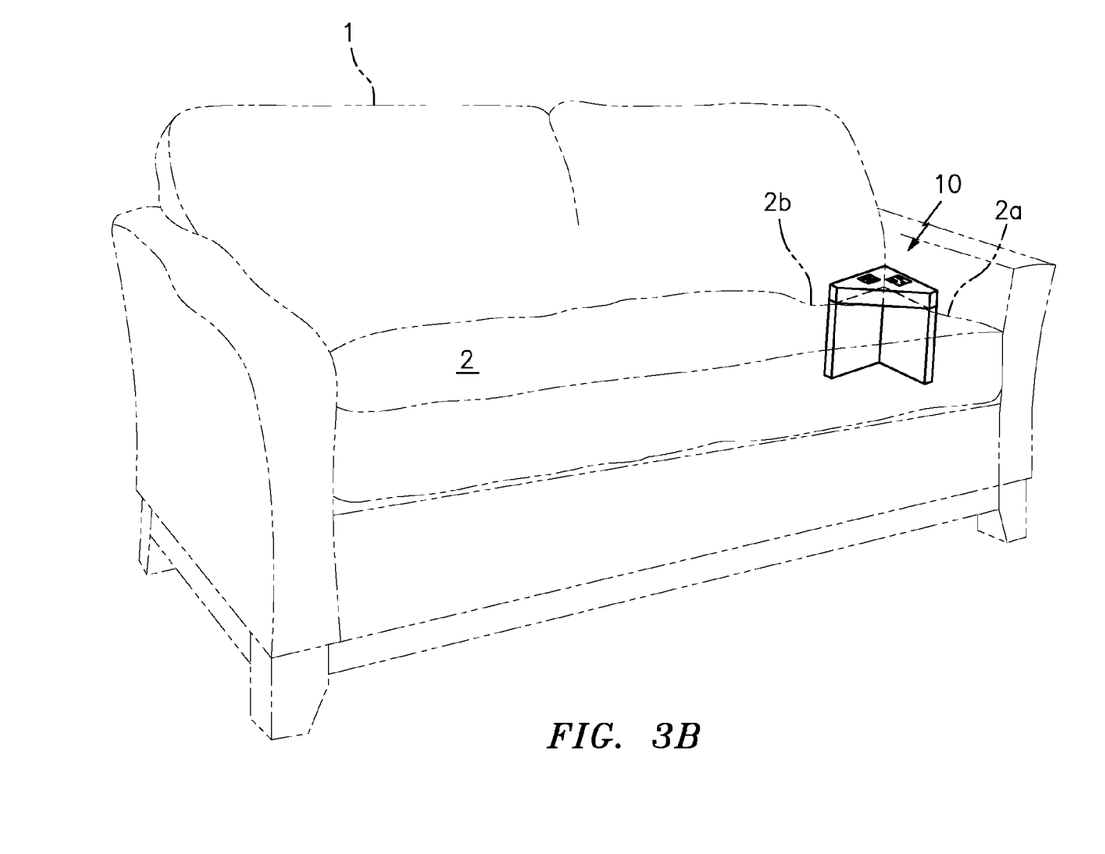
FIG. 3B is a perspective view of the portable furniture power outlet device in operation, in accordance with the embodiment of FIG. 3A.

Although described above as including a particular shape and construction material, this is for illustrative purposes only. To this end, the fin body can include any number of different shapes and sizes, and can be constructed from any number of different materials such as various plastics, wood and/or metal, for example. To this end, FIG. 3A illustrates one embodiment wherein the first and second side sections 31a and 31b include a central bend 33 forming a curve and/or a right angle. As shown in FIG. 3B, such a feature allows the fin to be positioned along the corner of the couch 1, so as to engage two sides 2a and 2b of a single cushion 2. This feature is particularly useful for chairs and other such furniture that only have one seat cushion.

Although described as including a single elongated fin member 30 that is permanently secured to the power module 20, other embodiments are also contemplated, wherein the fin is removably secured to the power module via tongue and groove fittings, for example. Moreover, other embodiments are also contemplated wherein one or more fin extension members are removably secured to the fin and can function to extend outward from in one or both of a vertical or horizontal manner. Such a feature can function to allow the dimension and/or shape of the fin to be altered, so as to allow the device to better mate with a piece of furniture without moving during use.

Figure 4:
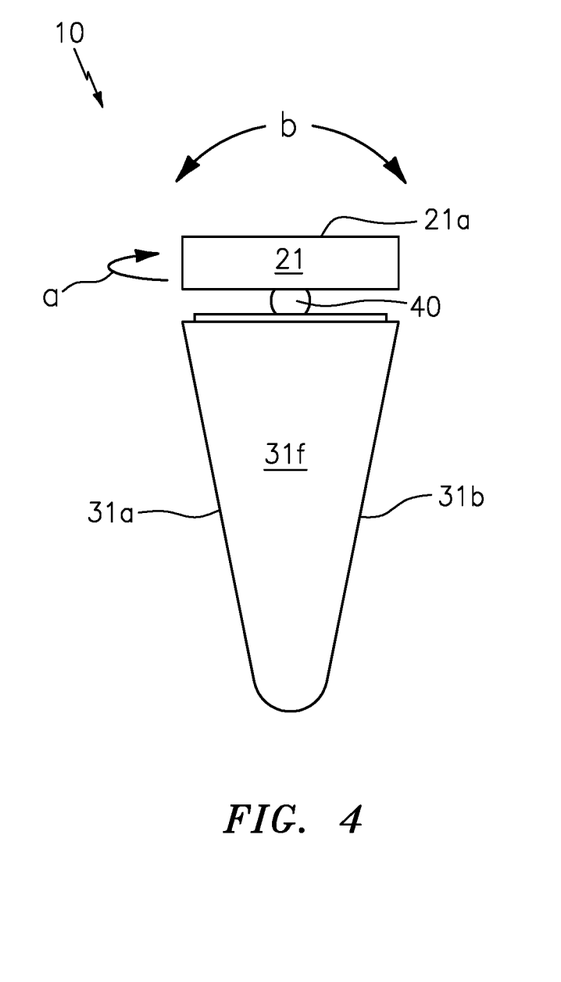
FIG. 4 is a front edge view of the portable furniture power outlet device, in accordance with one embodiment of the invention.

As shown in FIG. 4, the fin member 30 can also be pivotally secured to the power module 20. To this end, a connector 40 can be provided to allow a user to rotate the power module 360 degrees horizontally (see arrow a) and/or to pivot the power module vertically (see arrow b). One suitable example of a connector 40 can include a dual axis hinge, as is described in U.S. Pat. No. 7,979,960, the contents of which are incorporated herein by reference. Of course, any number of other connectors capable of allowing rotation and/or pivotal movement are also contemplated.

Figure 5A:
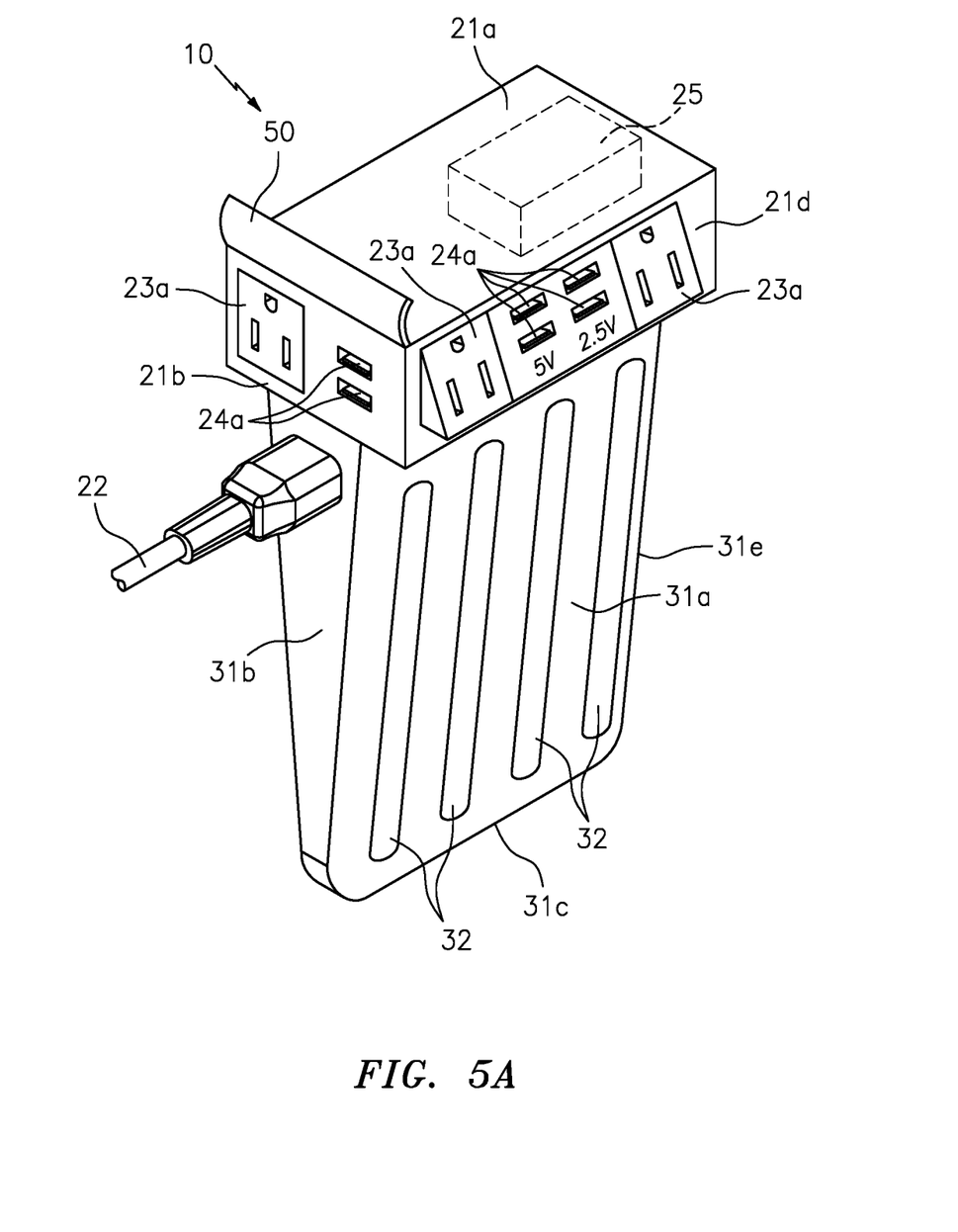
FIG. 5A is a perspective view of the portable furniture power outlet device, in accordance with another embodiment of the invention.
Figure 5B:
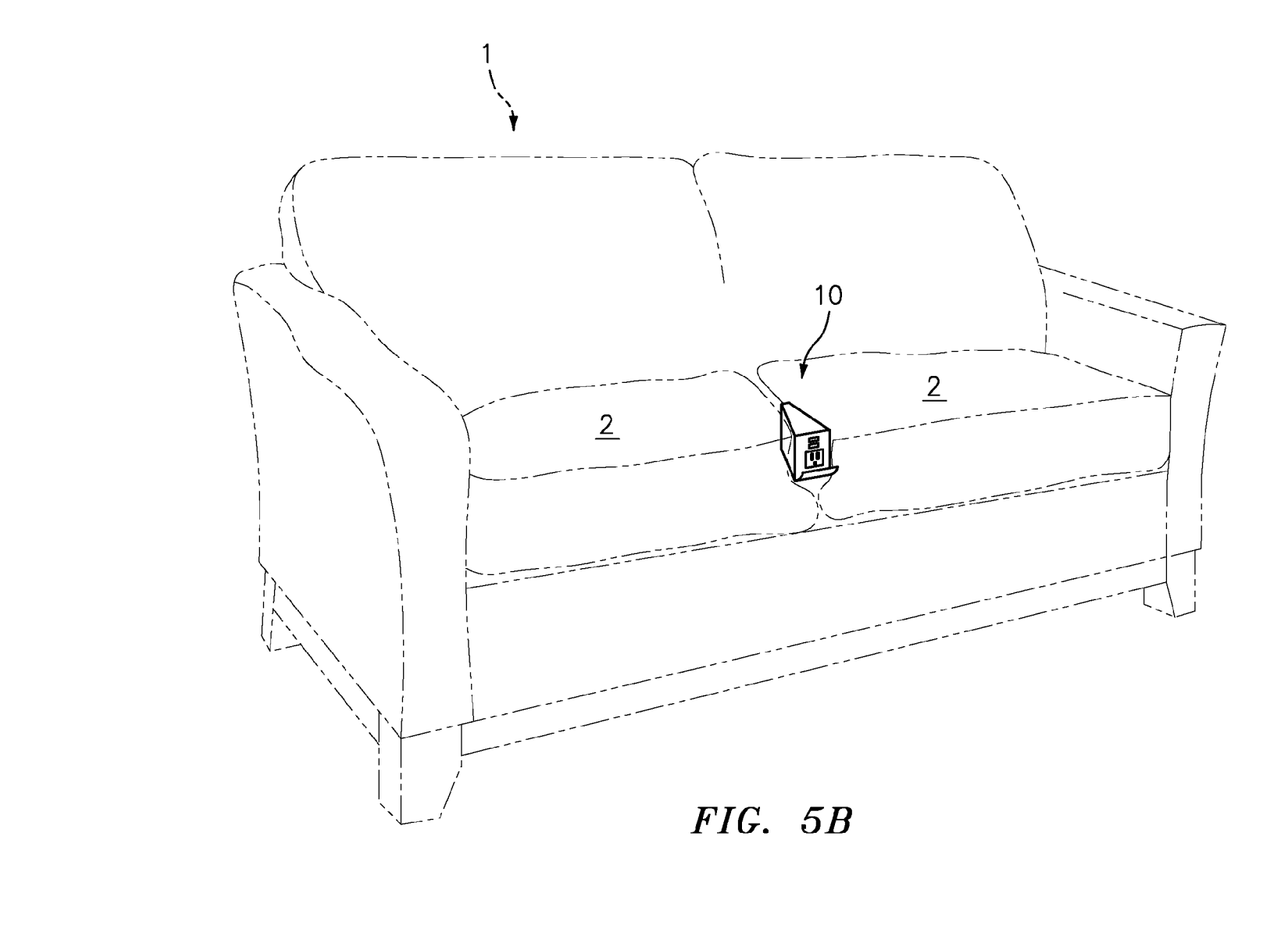
FIG. 5B is a perspective view of the portable furniture power outlet device in operation, in accordance with the embodiment of FIG. 5A.

As described above, the receptacles 23a and/or connector ports 24a can be positioned anywhere along the power module body. As such, FIG. 5A illustrates one embodiment of the device 10 wherein the top wall 21a includes an upstanding lip 50 along one edge, and each of the receptacles 23a and DC connector ports 24a are positioned along the front and side walls of the body 21b and 21d, respectively. As shown in FIG. 5B, the present embodiment allows the device 10 to be positioned with the elongated fin 30 horizontally between two cushions 2, so that the shelf top wall 21*a* rests along the front of the cushions in a vertical position. When so located, the lip 50 functions as a shelf for receiving a portable device 5. When so positioned, the device can be charged wirelessly via the transformer 25 or via a cord (not illustrated) that is plugged into one of the outlets or connector ports.

Accordingly, the above described portable furniture power outlet device 10 provides a portable power outlet for furniture that can be removably positioned along or between the cushions thereof, in order to provide a convenient location for charging portable electronic devices.

As described herein, one or more elements of the portable furniture power outlet device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements such as the power module body 21 and the elongated fin 30, for example, may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A portable outlet device for furniture, comprising:
   a power module main body having a top wall, a bottom wall and a plurality of upstanding walls defining an internal cavity;
   one or more power receptacles that are disposed along the power module main body;
   a power cord having a plug along a distal end thereof, said power cord being in communication with the power module; and
   an elongated fin member that extends longitudinally from the bottom wall of the power module, said fin member comprising a unitary wedge-shaped body having a shape and size that is configured to be removably secured between two cushions of a piece of furniture.

2. The device of claim 1, wherein the elongated fin member is pivotally secured to the power module via a connector.

3. The device of claim 2, wherein the connector is configured to rotate the power module 360 degrees horizontally with respect to the elongated fin member.

4. The device of claim 2, wherein the connector is configured to pivot the power module across a vertical axis, with respect to the elongated fin member.

5. The device of claim 2, wherein the connector includes a dual axis hinge that is configured to rotate the power module 360 degrees horizontally with respect to the elongated fin member; and
   pivot the power module across a vertical axis, with respect to the elongated fin member.

6. The device of claim 1, wherein each of the one or more power receptacles includes an A/C power receptacle or a DC connector port that are disposed along the power module main body.

7. The device of claim 6, wherein each of the one or more power receptacles comprises:
   a plurality of AC receptacles and a plurality of DC connector ports that are positioned along the power module main body.

8. The device of claim 6, further comprising:
   a transformer that is positioned within the internal cavity, said transformer functioning to change an AC input voltage to a plurality of different output DC voltages.

9. The device of claim 8, wherein the transformer is configured to sense a voltage requirement of an electronic device that is plugged into one of the plurality of DC connector ports and to automatically provide the required voltage to the one DC connector port.

10. The device of claim 8, wherein the transformer is further configured to perform wireless charging of a portable electronic device.

11. The device of claim 1, further comprising:
    a plurality of ridges that are positioned along one or both of a first and second side surfaces of the body of the elongated fin member.

12. The device of claim 1, wherein the body of the elongated fin member includes a central bend, said bend forming a generally right angle shape that is suitable for being removably positioned vertically along two sides of a cushion at a corner of the furniture.

13. The device of claim 1, further comprising:
    an upstanding lip that is disposed along one edge of the top wall.

14. The device of claim 11, wherein the plurality of ridges are constructed from rubber and are configured to prevent shifting of the elongated fin when in contact with a cushion of the furniture.

15. The device of claim 1, wherein the wedge-shaped body of the elongated fin member further comprises:
    a top end having a first cross dimensional thickness; and
    a bottom end having a second cross dimensional thickness.

16. The device of claim 15, wherein the first cross dimensional thickness is greater than the second cross dimensional thickness.

17. The device of claim 1, further comprising:
a high friction material that is positioned along at least one of the power module and the elongated unitary fin member, said material being configured to prevent shifting of the elongated fin when in contact with a cushion of the furniture.

18. A portable outlet device for furniture, comprising:
a power module main body having a top wall, a bottom wall and a plurality of upstanding walls defining an internal cavity;
one or more power receptacles that are disposed along the power module main body;
a power cord having a plug along a distal end thereof, said power cord being in communication with the power module; and
an elongated fin member that extends longitudinally from the bottom wall of the power module, said fin member including a body having a plurality of ridges that are positioned along one or both of a first and second side surface, for engaging at least one cushion of the furniture so as to removably position the power module adjacent thereto,
wherein the plurality of ridges are constructed from rubber and are configured to prevent shifting of the elongated fin when in contact with the at least cushion of the furniture.

* * * * *